Aug. 18, 1931.  H. PAXTON  1,819,480

METHOD OF DISPOSING OF CULL LETTUCE

Filed Nov. 17, 1930

INVENTOR:
HALE PAXTON,
By
ATTORNEY.

Patented Aug. 18, 1931

1,819,480

UNITED STATES PATENT OFFICE

HALE PAXTON, OF REDLANDS, CALIFORNIA

METHOD OF DISPOSING OF CULL LETTUCE

Application filed November 17, 1930. Serial No. 496,364.

My invention relates to farm product conservation methods and particularly to a method of and apparatus for conserving and disposing of cull lettuce.

The lettuce crop of the United States is over 100,000 cars per year. In the harvesting, packing and marketing of lettuce, at least one-third of the crop is of cull grade, that is, it is unmarketable. Most of this vast quantity of cull lettuce is sorted out of the harvested crop in the packing house. The present practice is to establish dumping grounds on isolated wasteland to which the cull lettuce is hauled in trucks. An average of two and a half truckloads must be thus hauled away for each car of lettuce shipped to market. In these dumps great heaps of cull lettuce accumulate and the stench of the decaying lettuce is wafted over the countryside almost throughout the year.

It is an object of my invention to dispose of cull lettuce in large quantities inexpensively and in a manner to eliminate decaying dumps.

Another problem of cull lettuce disposal is where a field of lettuce cannot be harvested before it becomes too old and tough to market. This situation occurs rather frequently and the problem is how to get rid of the old crop in order to prepare the soil for the next planting. Plowing the old crop under results in whole heads of lettuce rotting and making boggy spots in the soil when it is highly desirable that the soil be firm and homogeneous for proper nutriment of the young plants. Furthermore, these rotting lettuce heads become breeding nests for cutworms and other vermin or insects which pray on young lettuce plants, thus greatly increasing the difficulty of controlling these pests.

It is another object of my invention to provide a method of and apparatus for disposing of cull lettuce by which old crops of lettuce may be economically disposed of without injury to new crops and without supplying a breeding medium for predatory pests.

About sixty percent of the solid matter in cull lettuce is nitrogenous and when in shape to be assimilated by the soil makes a good fertilizer.

It is a still further object of my invention to provide a method of and apparatus for disposing of cull lettuce which eliminates the problems attending the decaying of this and makes available its nitrogenous fertilizer content for transportation at relatively small cost and application at the most advantageous season wherever desired, be it near to or remote from the point of production of the lettuce.

The manner of accomplishing the foregoing objects, as well as further objects and advantages, will be made manifest in the following description, together with the accompanying drawings, in which.

Figure 1:
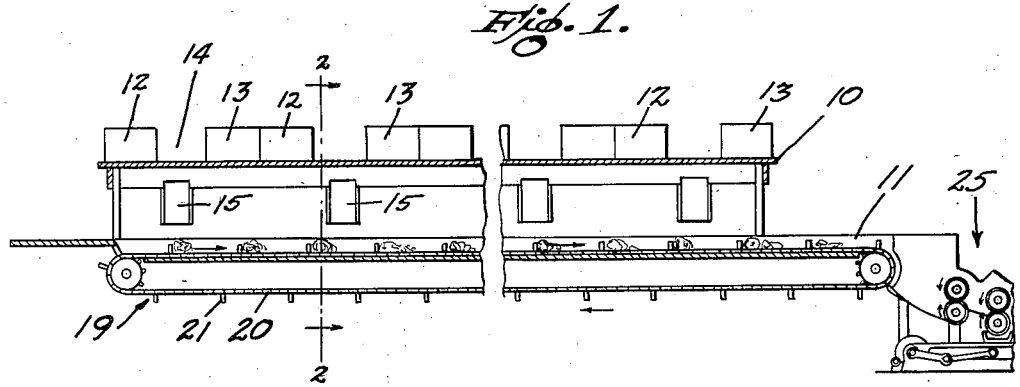
Fig. 1 is a longitudinal sectional view diagrammatically illustrating the apparatus of my invention.
Figure 2:
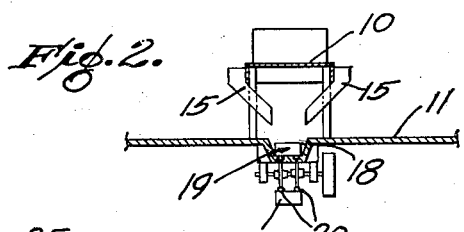
Fig. 2 is a cross sectional view taken on the line 2—2 of Fig. 1.

Referring specifically to the drawings, the apparatus of my invention includes a packing table 10 supported on a packing house floor 11, there being field crates 12 and shipping crates 13 set up on the table 10 in the order shown. The crates 12 and 13 are grouped in pairs as shown, with a space 14 between each adjacent pair of crates 12 and 13. Opposite each space 14 is provided a pair of cull chutes 15 at opposite sides of the table for a purpose to be described hereinafter.

Formed in the floor 11 beneath the table 10 is a trough 18 which is equipped with a scraper conveyer 19 of any desired construction, preferably employing a pair of endless chains 20 upon which are attached scraper paddles 21. The conveyer 19 is adapted to move in the direction of the arrows in Fig. 1 to convey cull lettuce, discharged into the trough 18 through the chutes 15, to a shredding and compressing apparatus 25 of my invention, a preferred embodiment of which is shown in detail in Fig. 3.

The apparatus 25 includes a hopper 26 into which cull lettuce 27 is delivered by the conveyer 19. Mounted at the lower end of the hopper 26 is a shredder 27 comprising a pair of rollers 28 having interspersed disc cutters 29 secured thereon. Extending between adjacent discs of the shredder 27 are an upper comb 30 and lower comb 31 of a second hopper 35.

Figure 3:
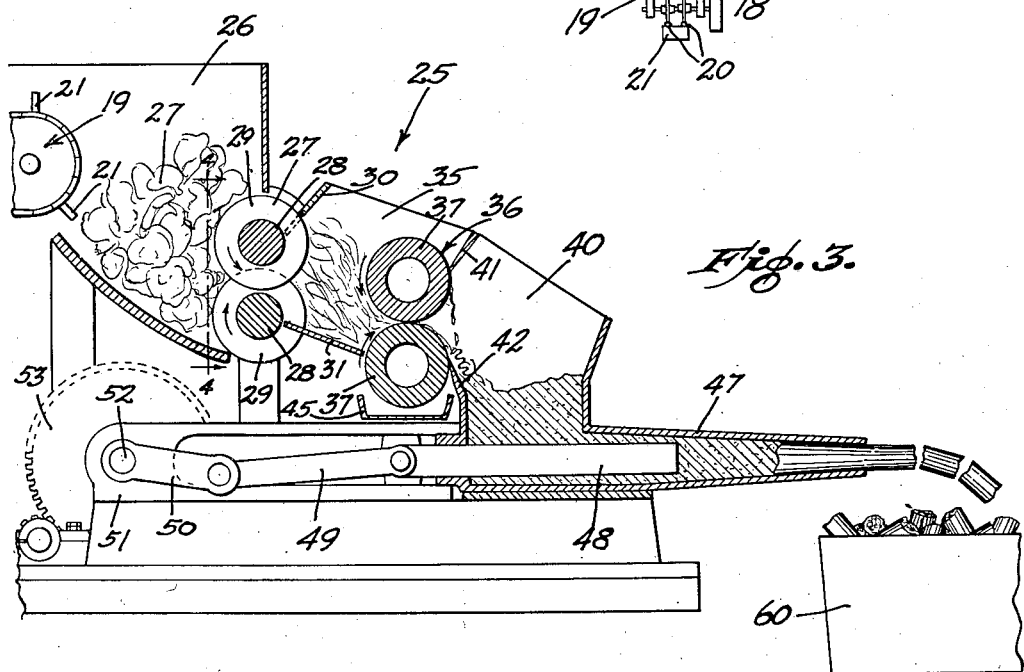
Fig. 3 is an enlarged detail view of the shredding and compressing apparatus of my invention.
Figure 4:
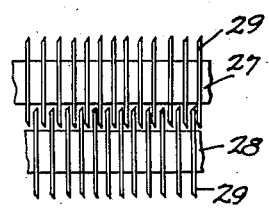
Fig. 4 is a fragmentary view taken on the line 4—4 of Fig. 3 illustrating a preferred form of the shredding apparatus of my invention.

At the lower end of the second hopper is provided a cull lettuce compressor 36 including a pair of steel compression rollers 37 which are mounted in suitable bearings and gear driven in opposite directions as indicated by the arrows in Fig. 3.

Beyond the compressor 36 is a hopper 40 having scraper blades 41 and 42 for removing compressed cull lettuce adhering to the surfaces of the rollers 37. Below the compressor 36 is a liquid drain pan 45. Connected with the lower end of the hopper 40 is a tapered compression tube 47 into which a ram 48 extends, this ram being operated by a pitman 49 and crank 50 suitably mounted on a frame 51 to be actuated by a shaft 52. The shaft 52 is driven by a gear and pinion means 53 which is driven from any suitable source of power.

The apparatus 25 is preferably located so that a truck 60 may be driven underneath the mouth of the tube 47 so that the compressed product of the apparatus 25 may be delivered into this truck.

The operation of my apparatus carrying out the process of my invention is as follows:

As before described, the cull lettuce is collected from the packing table 10 by the conveyer 19 and delivered to the hopper 26 of the apparatus 25.

The cutting rollers 28 and pressure rollers 37 and ram 48 are continuously in operation. The cull lettuce 27 therefore does not accumulate in the hopper 26 but is drawn between the rollers 28 of the shredder 27 from which the shredded cull lettuce passes through the hopper 35 in a continuous stream of relatively small volume between the steel desiccating rollers 37. The rollers 37 are placed very close together and are mounted in any manner suitable for high pressure roller presses so that when this small stream of shredded cull lettuce passes between these rollers the cell structure of the lettuce is practically entirely ruptured and the liquid squeezed therefrom, which runs backward over the lower roller 37 into the drip pan 45 which is positioned to collect this liquid. The pulp of the lettuce adheres to the surface of the rollers 37 until it meets the scrapers 41 and 42 which remove this pulp and permit it to drop into the hopper 40.

When the ram 48 moves into retracted position the pulp in the hopper 40 drops downwardly before this ram so that upon the next extension of the ram into the tapered tube 47 the pulp thus pushed in front of the ram is forced against the pulp already in the tube 47 so as to compress this into rod-like form as clearly illustrated in Fig. 3. This rod-like formation of pulp is readily broken off into chunks so that it can be transported as by the truck 60.

The great advantage of the method of my invention results from the fact that 94% of the lettuce is water, which is removed by the pressure rollers 47 so that the pulp, in rod-like formation, which is forced from the apparatus 25 constitutes only 6% in weight of the cull lettuce delivered to the apparatus. Furthermore, owing to its compact formation it has only about 1% of the bulk of the cull lettuce required to produce it. The final form to which the pulp is reduced, therefore, makes it very inexpensive to dispose of the cull lettuce as treated by the process of my invention. Thus, a packing house packing a hundred cars of lettuce per day, which now requires the dumping of two hundred and fifty truck loads of cull lettuce during the day, at an average cost of $375, will, with the use of my method and apparatus, disclosed herein, be able to dispose of this amount of cull lettuce by carting away only from three to five truck loads of pulp.

It is also desired to point out that the apparatus 25 can be readily mounted on a trailer hauled by a tractor, the latter supplying power for the operation of the apparatus, and hauled over a field having an unharvested crop which it is desired to dispose of. The crop can be cut up as by a weeder, and the lettuce heads forked into the hopper 26 and the pulp given a rod-like form and collected as the tractor proceeds in its path across the field, or else the desiccated pulp may be allowed to return directly onto the ground where it will be plowed in with the cultivation thereof. The water produced by the desiccator can also be allowed to run onto the land. Thus rotting of whole heads of lettuce on ground which it is necessary be prepared promptly after the harvest for replanting is entirely eliminated, as well as the disadvantages resulting from this and mentioned hereinbefore.

What I claim is:

1. A continuous process of disposing of cull lettuce and the like which consists in feeding said cull lettuce in a continuous stream through a point of application of pressure, and desiccating said stream, of cull lettuce by a continuous pressure applied at said point to said stream as it passes, and compressing the desiccated cull lettuce pulp into compact forms of relatively high density.

2. A continuous process of disposing of cull lettuce and the like which consists in feeding said cull lettuce in a continuous stream through a point of application of pressure, desiccating said stream of cull lettuce by a continuous pressure applied at said point to said stream as it passes, and compressing said desiccated cull lettuce into compact forms of relatively high density by forcing said desiccated lettuce through a restricted opening.

3. A continuous process of disposing of cull lettuce and the like which consists in feeding said cull lettuce in a continuous stream through a point of application of pressure, and desiccating said stream of cull lettuce by a continuous pressure applied at said point to said stream as it passes, and compressing the desiccated cull lettuce pulp into compact forms of relatively high density by forcing said desiccated cull lettuce in a stream along a tapering chamber with a restricted opening at its discharge end.

4. A continuous process of disposing of cull lettuce and the like which consists in feeding said cull lettuce in a continuous stream of relatively small volume, applying a relatively heavy pressure continuously to said stream at a given point therein so as to rupture practically the entire cell structure of said cull lettuce and squeeze the water therefrom, and compressing the desiccated pulp resulting from the foregoing step into compact forms of relatively high density.

5. A continuous process of disposing of cull lettuce and the like which consists in feeding said cull lettuce in a stream to a given point, continuously applying a relatively heavy pressure to said stream at said point to rupture the cell structure of said cull lettuce and remove the liquid therefrom, and forcing the pulp, resulting from the aforementioned step, through a chamber with a restricted discharge opening to give said pulp a rod-like form of relatively high density.

In testimony whereof, I have hereunto set my hand at Sanger, California, this 10th day of November, 1930.

HALE PAXTON.